E. JONES.
GLASS-MELTING POT AND FURNACE.
No. 177,130. Patented May 9, 1876.
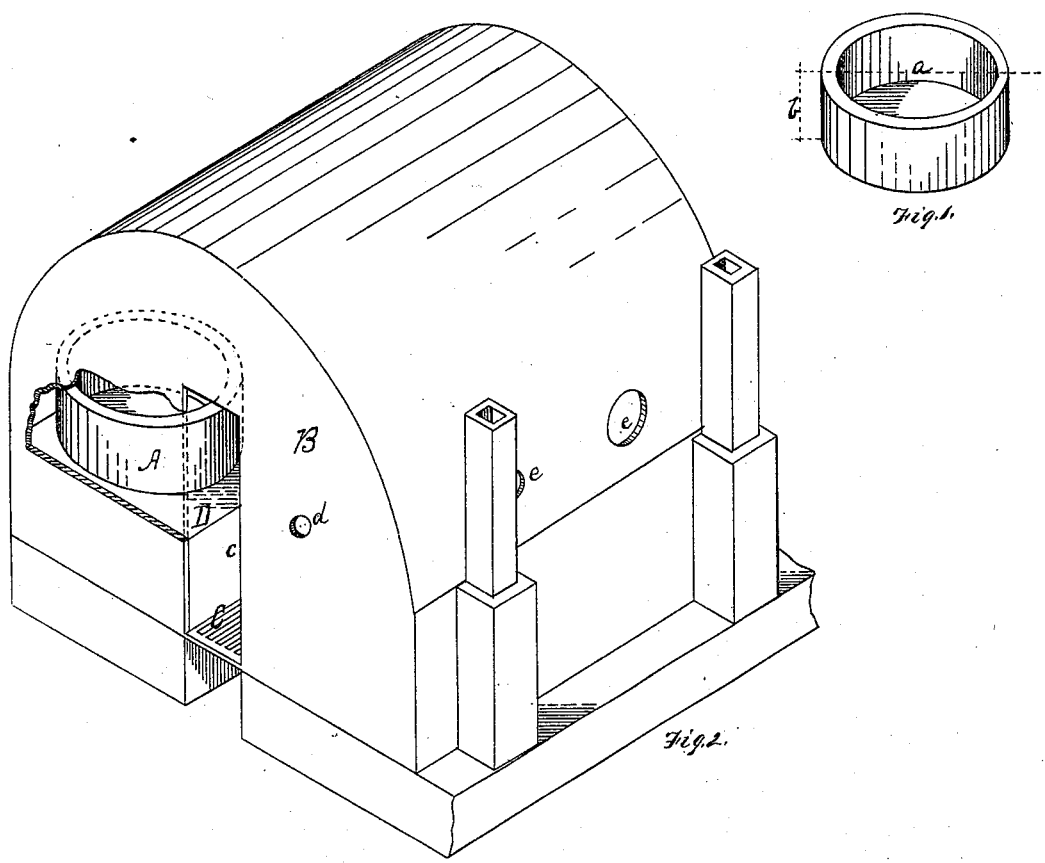
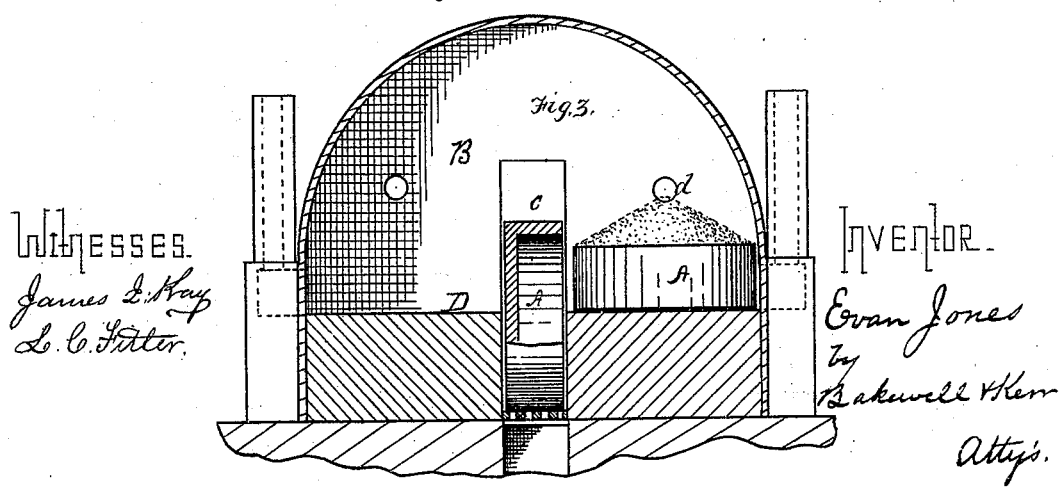

UNITED STATES PATENT OFFICE.

EVAN JONES, OF PITTSBURG, PENNSYLVANIA.

IMPROVEMENT IN GLASS-MELTING POTS AND FURNACES.

Specification forming part of Letters Patent No. 177,130, dated May 9, 1876; application filed April 19, 1876.

*To all whom it may concern:*

Be it known that I, EVAN JONES, of Pittsburg, in the county of Allegheny and State of Pennsylvania, have invented a new and useful Improvement in Glass-Melting Pots and Furnaces; and I do hereby declare the following to be a full, clear, and exact description thereof, reference being had to the accompanying drawing, forming part of this specification, in which—

Figure 1 is a view of my improved glass-melting pot. Fig. 2 is a perspective view, partly in section, of the modified form of furnace specially adapted for use with my improved pots; and Fig. 3 is a vertical transverse section of the furnace.

Like letters refer to like parts wherever they occur.

My invention relates to the construction of glass-melting pots, and furnaces therefor, and is more especially adapted to the manufacture of window-glass, bottles, glass, &c.; and consists, first, in reducing the height and increasing the relative diameter of the pot, so that the charge may be introduced at a single filling and the fire-surface of the pot increased, whereby the time of melting a charge is greatly diminished; and, second, in narrowing the "zone" or fire-space of the furnace and bringing the bench up thereto, so as to get the full effect of the fire upon the pots, and thus diminish the time required to melt a charge.

Heretofore, in the manufacture of window-glass, bottle-glass, and like qualities of glass, where an open pot is commonly employed, the height of the pot has been about equal to its diameter, and, in preparing a batch of glass, the common method has been to fill the pot with the mixture and melt it down, thus obtaining about one-third of a pot of glass, refill the pot, and again melt it down, and so continue to refill and melt until the required quantity of glass is obtained. It usually requires three or four successive fillings and meltings and takes from twelve to fourteen hours, to obtain a pot of glass by this method. The method of setting this class of pots now in use and commonly employed is to turn the pot upon its side, and introduce it bottom first through the door and along the zone until it is opposite to its proper place on the bench, when it is lifted into place. This method of introducing the pot and the form of the pot requires the common furnace to be made with a sloping bench, so that the pot being introduced can pass the pots already on the bench in the furnace. The sloping bench necessitates the setting of the pots back from the zone or grate, and thus the full effect of the fire is not obtained.

The object of the present invention, therefore, is to so construct the pots as to reduce the time required to melt the charge, and so construct the furnace as to adapt it to the new form of pot, and likewise obtain the full effect of the fire.

I will now proceed to describe my invention, so that others skilled in the art to which it appertains may make and use the same.

In the drawing, A indicates my improved pot, which will be of sufficient size to hold the required batch, but will be made of great diameter relative to its height. The size which I have used, and which may be here given, not as a limit, but simply for illustration, is as follows: diameter, $a$, fifty-five (55) inches; height, $b$, seventeen (17) inches—or in about the proportions of one to three. Pots of this form are made of clay, and in the usual manner; but such a pot could not be set in the furnace now in use. I therefore construct a furnace, B, of the form shown—that is, with a zone or grate, C, slightly wider than the height of the pot, and with a door or arch, $c$, slightly higher than the diameter of the pot—for illustration, say twenty and fifty-eight inches, respectively —and with benches D equal to or somewhat wider than the pots, (say fifty-five or fifty-six inches.) These benches D are flush with the sides of the grate C, so that when the pots are on the benches they will be subject to the full and direct action of the fire on the grate. $d$ and $e$ are the usual gathering and blow holes.

With the exceptions above specified, the furnace may be constructed of the usual materials and in the usual manner.

In setting one of my improved pots, it is turned upon its side, with the bottom of the pot toward the side of the furnace on which its bench is located, as shown in Fig. 3, is then rolled along the zone until opposite its place on the bench, when it may be slightly lifted and lowered into position upon the bench with less than half the labor required to set the old pots. As the pot and bench are of, or about of, equal width, the pot will be flush with the zone.

In filling the pot with the "frit" it is heaped, (see dotted line,) and, owing to its increased diameter, it will, when so heaped, hold more than a deeper pot of less diameter, so that, upon the melting of the filling, the pot will be found to be nearly full of glass, and the charge, being spread out so as to be more fully exposed to the heat, will be melted in much less time— say from three to five hours.

Among the advantages arising from my improved pot and furnace are, first, the saving of from one half to two-thirds of the time heretofore required for the melting, so that the pot will make from two to three times the usual number of melts, thus requiring a fewer number of pots to do the work and smaller furnaces; second, the saving of fuel; thirdly, the pots being shallow, the pressure of the molten glass on the sides of the pot is so small as to obviate any liability of the pots bursting in the furnace, as is likely to occur with deep pots; fourthly, the increased fire-surface and the shallowness of the pots render the heat more effective in melting the frit, and the glass, having a larger surface and less depth, will purify and become solid quicker than in the pots now in use; and, finally, the furnace will turn out from two to three times as much glass before it burns out.

Having thus described my invention, what I claim, and desire to secure by Letters Patent, is—

1. A glass-melting pot the diameter of which is increased and the height decreased, in about the relative proportions and for the purpose specified.

2. The glass-melting furnace having the benches flush with the zone or grate, substantially as and for the purpose specified.

In testimony whereof I, the said EVAN JONES, have hereunto set my hand.

EVAN JONES.

Witnesses:
ALEX. W. FOSTER, Jr.,
JAMES I. KAY.